(12) United States Patent
Khokhlov et al.

(10) Patent No.: US 12,051,812 B2
(45) Date of Patent: Jul. 30, 2024

(54) RECHARGEABLE CELL ARCHITECTURE

(71) Applicant: Zelos Energy Ltd., San Leandro, CA (US)

(72) Inventors: Pavel Khokhlov, San Ramon, CA (US); Alexander Gorer, Brisbane, CA (US); Sebastien Belanger, Alameda, CA (US); Jonathan Truskier, Oakland, CA (US)

(73) Assignee: Zelos Energy Ltd., San Leandro, CA (US)

( * ) Notice: Subject to any disclaimer, the term of this patent is extended or adjusted under 35 U.S.C. 154(b) by 61 days.

(21) Appl. No.: 17/686,075

(22) Filed: Mar. 3, 2022

(65) Prior Publication Data

US 2022/0285695 A1    Sep. 8, 2022

Related U.S. Application Data

(60) Provisional application No. 63/157,447, filed on Mar. 5, 2021.

(51) Int. Cl.
| | |
|---|---|
| *H01M 4/78* | (2006.01) |
| *H01M 4/131* | (2010.01) |
| *H01M 4/134* | (2010.01) |
| *H01M 4/1391* | (2010.01) |
| *H01M 4/1395* | (2010.01) |
| *H01M 50/583* | (2021.01) |

(52) U.S. Cl.
CPC ............. *H01M 4/78* (2013.01); *H01M 4/131* (2013.01); *H01M 4/134* (2013.01); *H01M 4/1391* (2013.01); *H01M 4/1395* (2013.01); *H01M 50/583* (2021.01)

(58) Field of Classification Search
CPC ...... H01M 4/131; H01M 4/78; H01M 50/583; H01M 50/58; H01M 4/134
See application file for complete search history.

(56) References Cited

U.S. PATENT DOCUMENTS

| | | | |
|---|---|---|---|
| 6,410,189 B1 | 6/2002 | Yamada |
| 6,727,022 B2 | 4/2004 | Gan |
| 6,849,353 B2 | 2/2005 | Vora |
| 8,389,180 B2 | 3/2013 | Hawkes |
| 9,390,866 B2 | 7/2016 | Hosoe |
| 10,818,927 B2 | 10/2020 | Haverkate |

(Continued)

FOREIGN PATENT DOCUMENTS

| | | |
|---|---|---|
| CN | 105990614 | 10/2016 |
| CN | 108701834 | 10/2018 |

(Continued)

*Primary Examiner* — Kenneth J Douyette
(74) *Attorney, Agent, or Firm* — David R. Stevens; Stevens Law Group

(57) ABSTRACT

A rechargeable battery cell includes first and second electrode materials. A first collector defining a chamber array with a plurality of chambers is electrically connected to each other. A plurality of second electrode material and second collectors are positioned within each of the plurality of chambers. A first electrode material is positioned within the first collector to surround the second electrode material, with the second electrode material separated from the first electrode material by a separator.

15 Claims, 9 Drawing Sheets

(56) References Cited

U.S. PATENT DOCUMENTS

2010/0291426 A1\* 11/2010 Zhou ............... H01M 50/583
　　　　　　　　　　　　　　　　　　429/99
2013/0189592 A1　7/2013　Roumi
2018/0040902 A1　2/2018　Jiang

FOREIGN PATENT DOCUMENTS

| CN | 209515858   | 10/2019 |
|----|-------------|---------|
| EP | 3203573     | 8/2017  |
| WO | 2005/036711 | 4/2005  |
| WO | 2010/032159 | 3/2010  |
| WO | 2020/028168 | 2/2020  |

\* cited by examiner

RECHARGEABLE CELL ARCHITECTURE

RELATED APPLICATIONS

This application claims the benefit of U.S. Provisional Application Ser. No. 63/157,447, filed Mar. 5, 2021, which is hereby incorporated herein by reference in its entirety for all purposes.

TECHNICAL FIELD

The present disclosure relates generally to the field of batteries and components for batteries. More specifically, the present application relates to batteries or cells and their manufacturing that include a common collector array that contains a first electrode material, with each member of the collector array further including a second electrode material and a second electrode current collector.

BACKGROUND

There is a great demand for low cost rechargeable battery systems with a high energy density for portable devices, electric vehicles, grid storage and other applications. Recently lithium ion batteries have become a popular technology of choice for many energy storage applications. Unfortunately, limited availability of key metals, high energy costs and safety risks associated with Li-ion technology limit wide adoption of these batteries in many applications. Easily manufacturable batteries using low cost materials are needed for many applications.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1A:
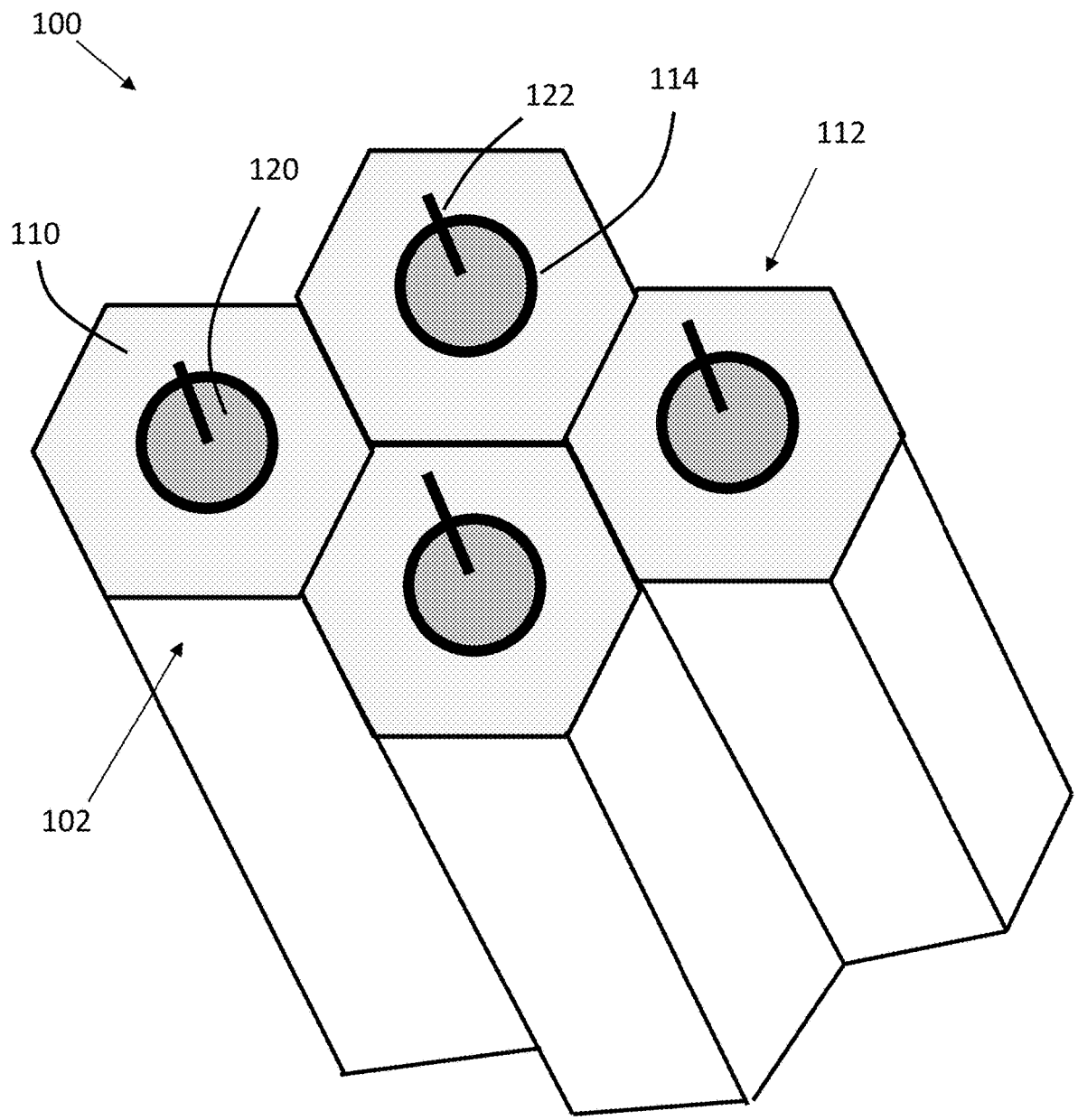
FIG. 1A illustrates a common collector array that contains a first electrode material, with each member of the collector array including a second electrode material and a second electrode current collector.

In some embodiments, as described with respect to the disclosed Figures and specification, a rechargeable battery cell includes first and second electrode materials. A first collector defining a chamber array with a plurality of chambers is electrically connected to each other. A plurality of second electrode material and second collectors are positioned within each of the plurality of chambers. A first electrode material is positioned within the first collector to surround the second electrode material, with the second electrode material separated from the first electrode material by a separator.

More specifically, FIG. 1 illustrates a rechargeable battery cell system 100 that includes a first electrode (in this embodiment a cathode collector array 102) that includes multiple electrically connected chambers 112 that surround other battery components. Such battery components include first electrode (e.g., cathode material 110) and second electrode (e.g., anode material 120), both of which can be partially or fully immersed in an electrolyte. It will be understood that in this and the following embodiments, cathode material can be replaced with anode material, as long as corresponding anode material is replaced with cathode material.

The anode material surrounds an anode collector 122. The cathode material 110 and anode material 120 are separated from each other by a separator 114 that only permits electrolyte mediated ion flow back and forth between the cathode and anode materials. In some embodiments, open sides of the chambers 112 and included separator 114, anode material 122, and anode collector 122 can be completely or partially sealed with electrically non-conductive materials such as plastics. In some embodiments, open top and bottom sides of the separator 114, anode material 122, and anode collector 122 can be separately sealed with non-conductive material before positioning within the chambers 112. In other embodiments, various materials such as ion exchange materials, stabilizers, additives, and binders can be used to improve battery cell system performance.

In some embodiments, the multiple electrically connected chambers 112 of the cathode collector array 102 can be defined as having cross sections that include polygonal, circular, hexagonal, square, rectangular, arcuate sections, other suitable combinations of regular or irregular cross sections, or contacting or electrically connectable chambers. In some embodiments chambers 112 can be regularly or irregularly shaped and positioned with respect each other but will commonly at least partially share at least one chamber sidewall with an adjacent chamber. The chambers 112 can sized to be less than 5 cm in average width, with cell width between 1 mm and 1 cm being typical. Similarly, height of the chambers 112 can be less than 20 cm in average height, with cell height between 1 mm and 10 cm being typical. In some embodiments chamber height can be greater than chamber width, while in others chamber height can be less than chamber width. Depending on application, shape, dimensions, width, and height of the chambers can be modified, with the collector array 102 supporting differing types of connected chambers.

In some embodiments, the separator 114, anode material 122, and anode collector 122 positioned withing the multiple electrically connected chambers 112 of the cathode collector array 102 can be defined as circular, hexagonal, square, polygonal or other shapes. In some embodiments the combination of separator 114, anode material 122, and anode collector 122 can be regularly or irregularly shaped. In some embodiments, the combination of the anode and the separator can fill chambers 112. In other embodiments, the combination of separator 114, anode material 122, and anode collector 122 can be sized to fit within chambers 112 and can sized to be less than 1 cm in average width, with cell width between 1 mm and 1 cm being typical. Similarly, the height of the combination of separator 114, anode material 122, and anode collector 122 can be less than 1 cm in average width, with cell width between 1 mm and 1 cm being typical. Depending on application, shape, dimensions, width, and height of the combination of separator 114, anode material 122, and anode collector 122 can be modified, with the collector array 102 capable of holding various combinations of separator 114, anode material 122, and anode collector 122.

In some embodiments, the anode collector can be one or more wires, strips, foils, pillars, or other electrically conductive material that can be positioned in contact with anode material 120 and configured for electrical connection with other anode collectors 122. In some embodiments the anode collector 122 can extend significantly outward from the chamber 112, simplifying electrical interconnection of the anode collectors 122. Extending the anode collectors 122 outward from the chamber can also simplify sealing or covering the chamber and contained cathode and anode material, while still allowing access for electrical interconnection of the anode collectors 122.

Figure 1B:
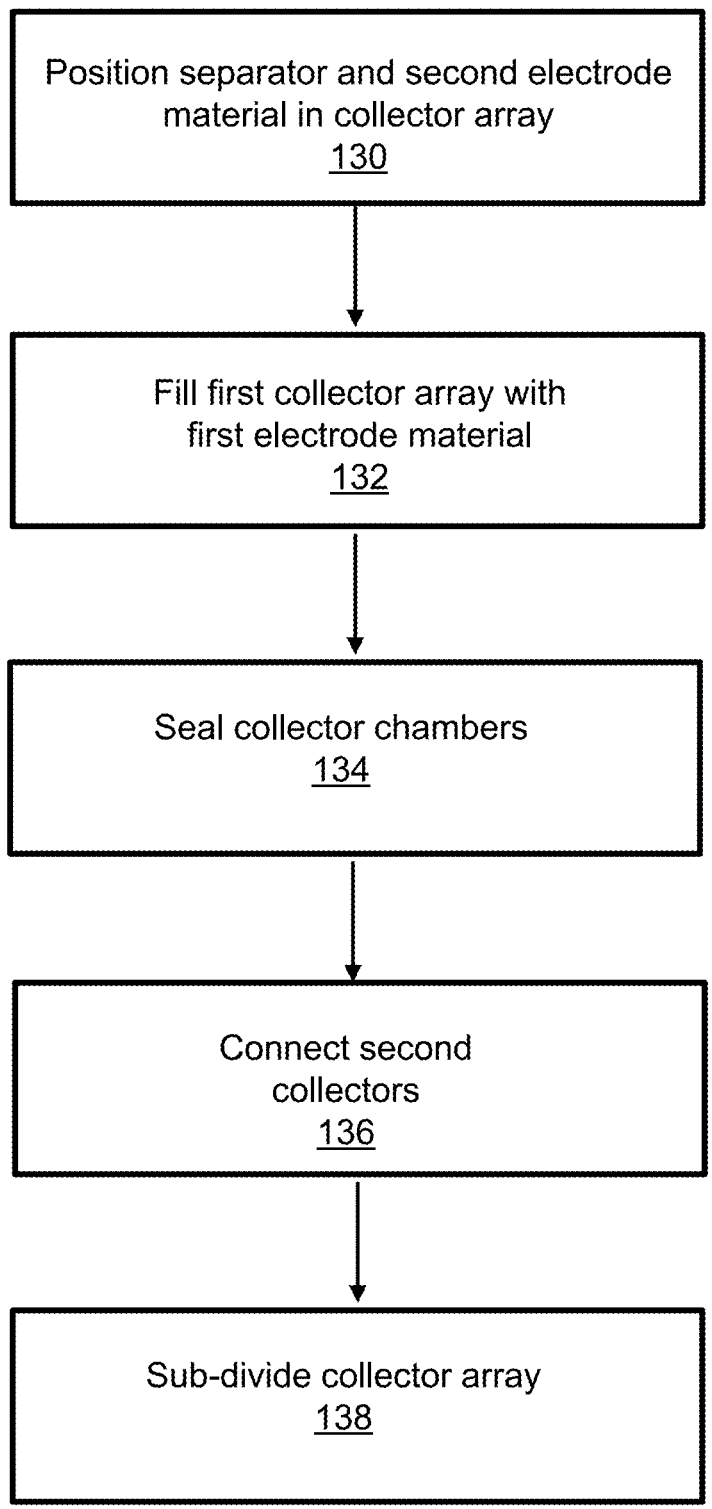
FIGS. 1B, 1C, and 1D illustrate various processing embodiments for manufacture of a structure such as described with respect to FIG. 1A.

FIG. 1B illustrates one processing embodiment for a structure such as described with respect to FIG. 1A. In this embodiment, first and second electrode materials can respectively act as either anode or cathode, or cathode and anode, depending on composition. At least one combination of separator, second electrode material, and second collector are positioned within each chamber in step 130. In some embodiments, the combination of separator, second electrode material, and second collector are sealed with a non-conductive material before placement in the chamber, while in other embodiments the separator and second collector are placed withing the chamber, with second electrode material then being deposited within the separator before later sealing with a non-conductive material. In steps 132, the collector array is filled with first electrode material that can be in powder, slurry, gel, or liquid form. In some embodiments, the first electrode material can be shaken to settle powder, or chemically or thermally treated to activate. In step 134 the collector chambers are top, and bottom sealed to prevent escape of first electrode material. In some embodiments, the second collector extends outward from the collector chambers, allowing connection of the second collectors as step 136. In continuous process manufacturing embodiments, the collector array with contained anode and cathode electrode material can be subdivided in step 138 to form batteries of a desired shape and power, depending on number of chambers provided.

Figure 1C:
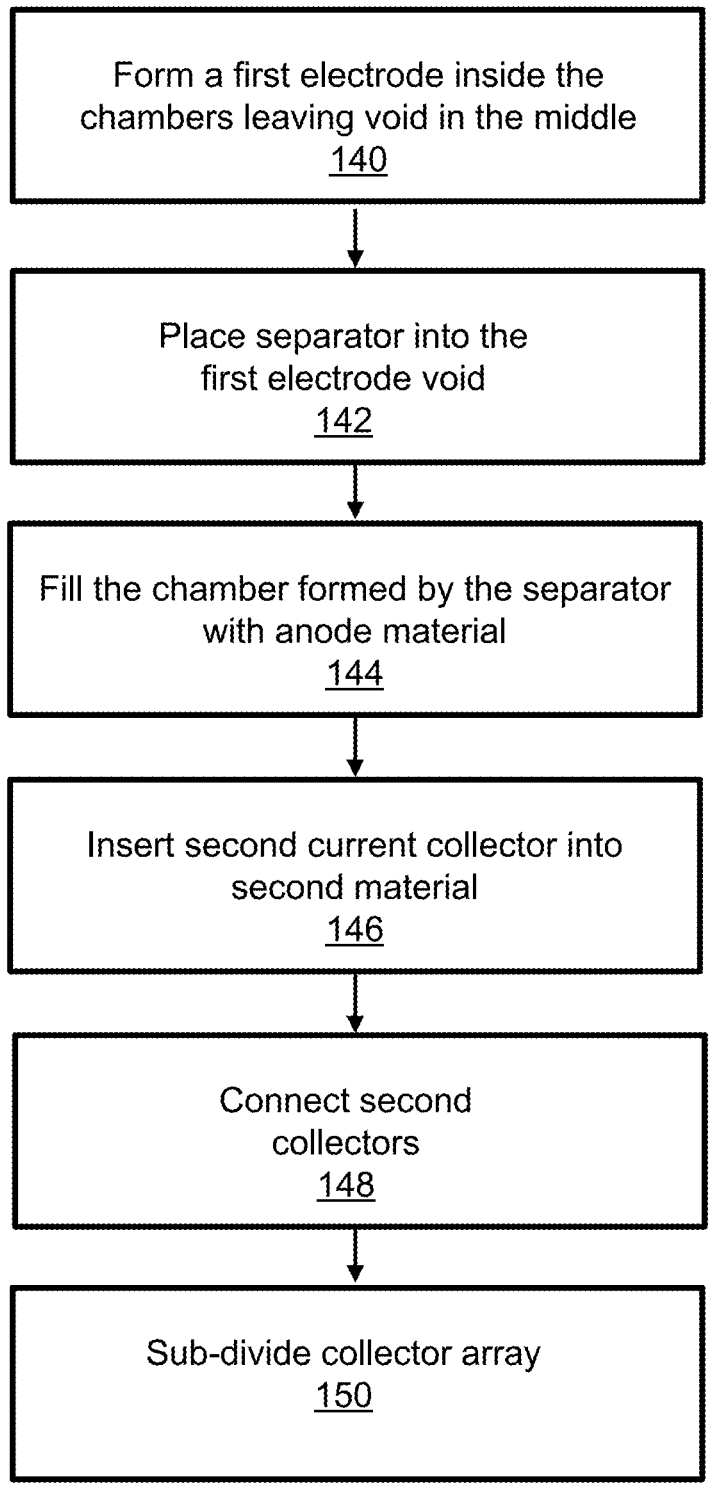

FIG. 1C illustrates another processing embodiment for a structure such as described with respect to FIG. 1A. In this embodiment, a first electrode (i.e., acting as one of a cathode or anode) is formed inside the current collector chambers adjacent to the chamber walls. In some embodiments, the first electrode formation process may be accompanied by the application of pressure, heat, shaking, or combinations of such processes. The void inside the first electrode mass is maintained during the first electrode forming process by inserted template that can be removed after the first electrode formation is completed. The void can be lined inside by a separator (step 142). Then the second electrode material that can be in the form of slurry, gel or solid powder is poured inside the void lined with the separator (step 144). After the void is filled with the second electrode material a second current collector is inserted inside the second electrode material (step 146). In some embodiments, the second collector extends outward from the collector chambers, allowing connection of the second collectors as step 148. In continuous process manufacturing embodiments, the collector array with contained anode and cathode electrode material can be subdivided in step 150 to form batteries of a desired shape and power, depending on number of chambers provided.

Figure 1D:
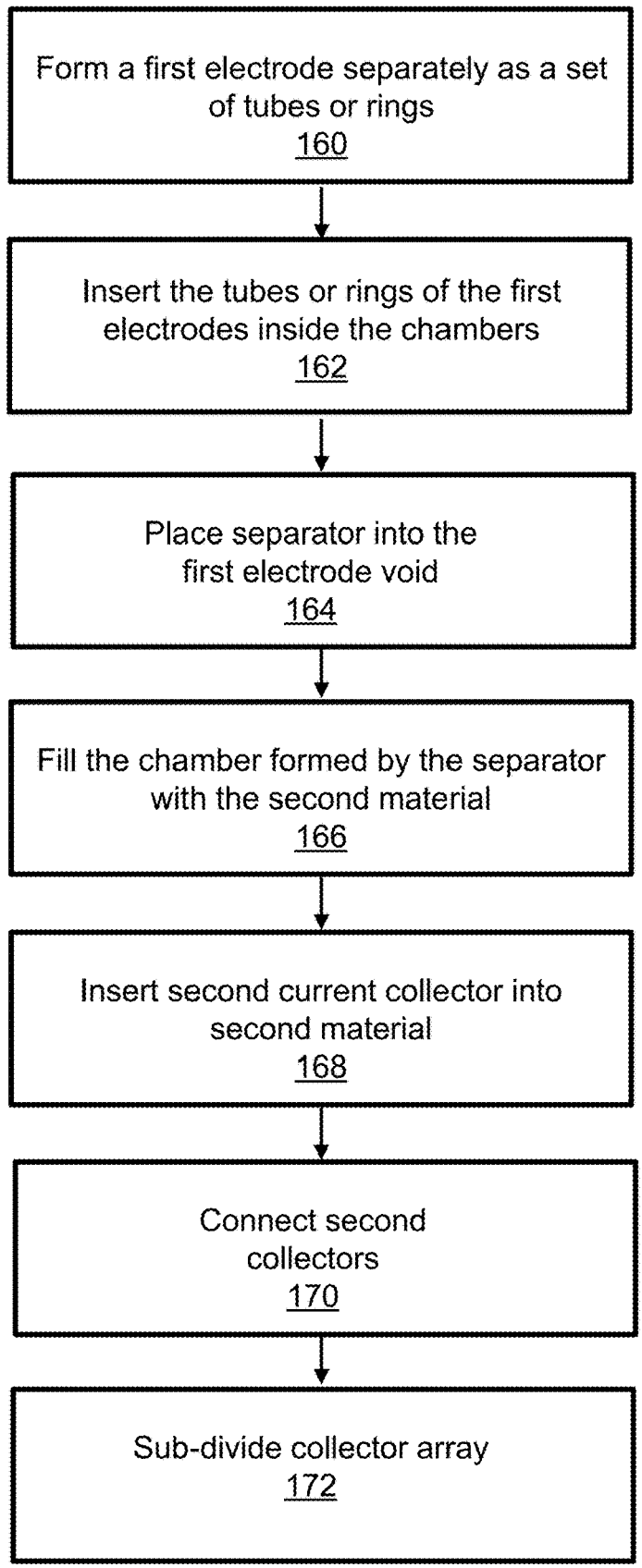

FIG. 1D illustrates another processing embodiment for a structure such as described with respect to FIG. 1A. In this embodiment, a first electrode (i.e., acting as one of a cathode or anode) is formed outside the current collector chambers into a shape of a tube or ring or set of rings depending on the chamber geometry (step 160). In some embodiments, the first electrode formation process may be accompanied by pressure application, heat application, shaking or combination of such processes. Then the tubes or rings of the first electrode are inserted into the current collector chambers (step 162). The void inside the first electrode can be lined inside by a separator (step 164). Then the second electrode material that can be in the form of slurry, gel, or solid powder is poured inside the void lined with the separator (step 166). After the void is filled with the second electrode material a second current collector is inserted inside the second electrode material (step 168). In some embodiments, the second collector extends outward from the collector chambers, allowing connection of the second collectors as step 170. In continuous process manufacturing embodiments, the collector array with contained anode and cathode electrode material can be subdivided in step 172 to form batteries of a desired shape and power, depending on number of chambers provided.

Figure 2A:
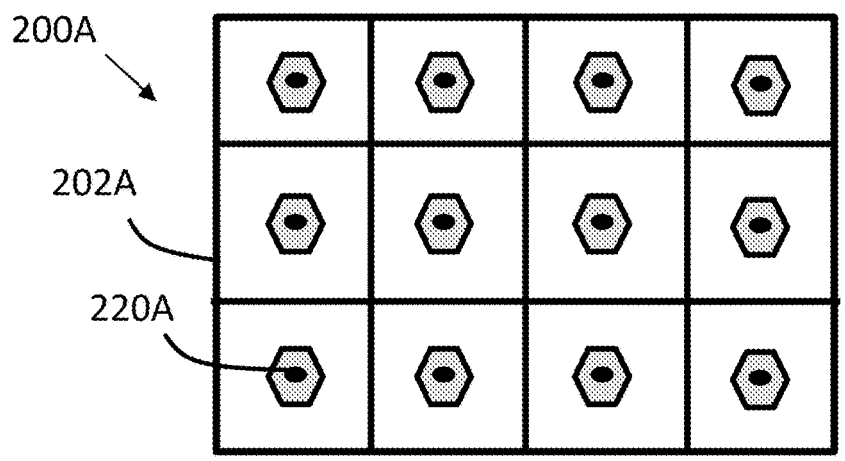
FIGS. 2A-D illustrates various forms of collectors.

FIG. 2A illustrates one alternative embodiment of collector array geometry 200A. In this embodiment, rectangular chambers 202A have centrally positioned hexagonal anode electrodes 220A formed by the combination of separator, anode material, and anode collector. As will be understood, each electrically conductive rectangular chamber can share sidewalls with multiple adjacent chambers.

Figure 2B:
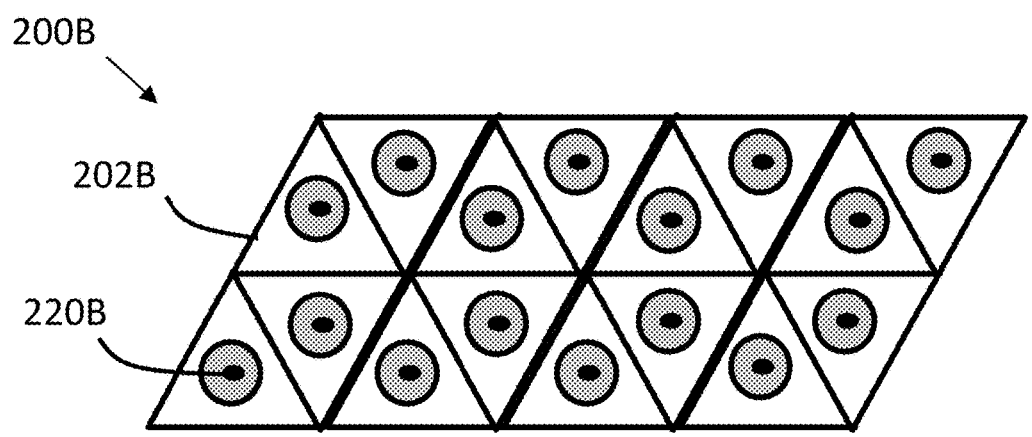

FIG. 2B illustrates one alternative embodiment of collector array geometry 200B. In this embodiment, triangular chambers 202B have centrally positioned circular anode electrodes 220B formed by the combination of separator, anode material, and anode collector. As will be understood, each electrically conductive triangular chamber can share sidewalls with multiple adjacent chambers.

Figure 2C:
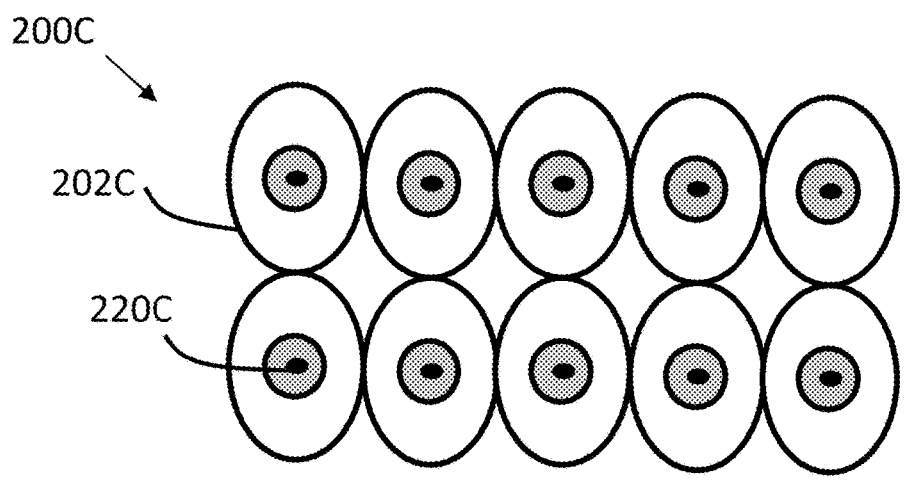

FIG. 2C illustrates one alternative embodiment of collector array geometry 200C. In this embodiment, ovoid chambers 202C have centrally positioned circular electrodes 220C formed by the combination of separator, anode material, and anode collector. As will be understood, each electrically conductive chamber can partially share sidewalls with multiple adjacent chambers.

Figure 2D:
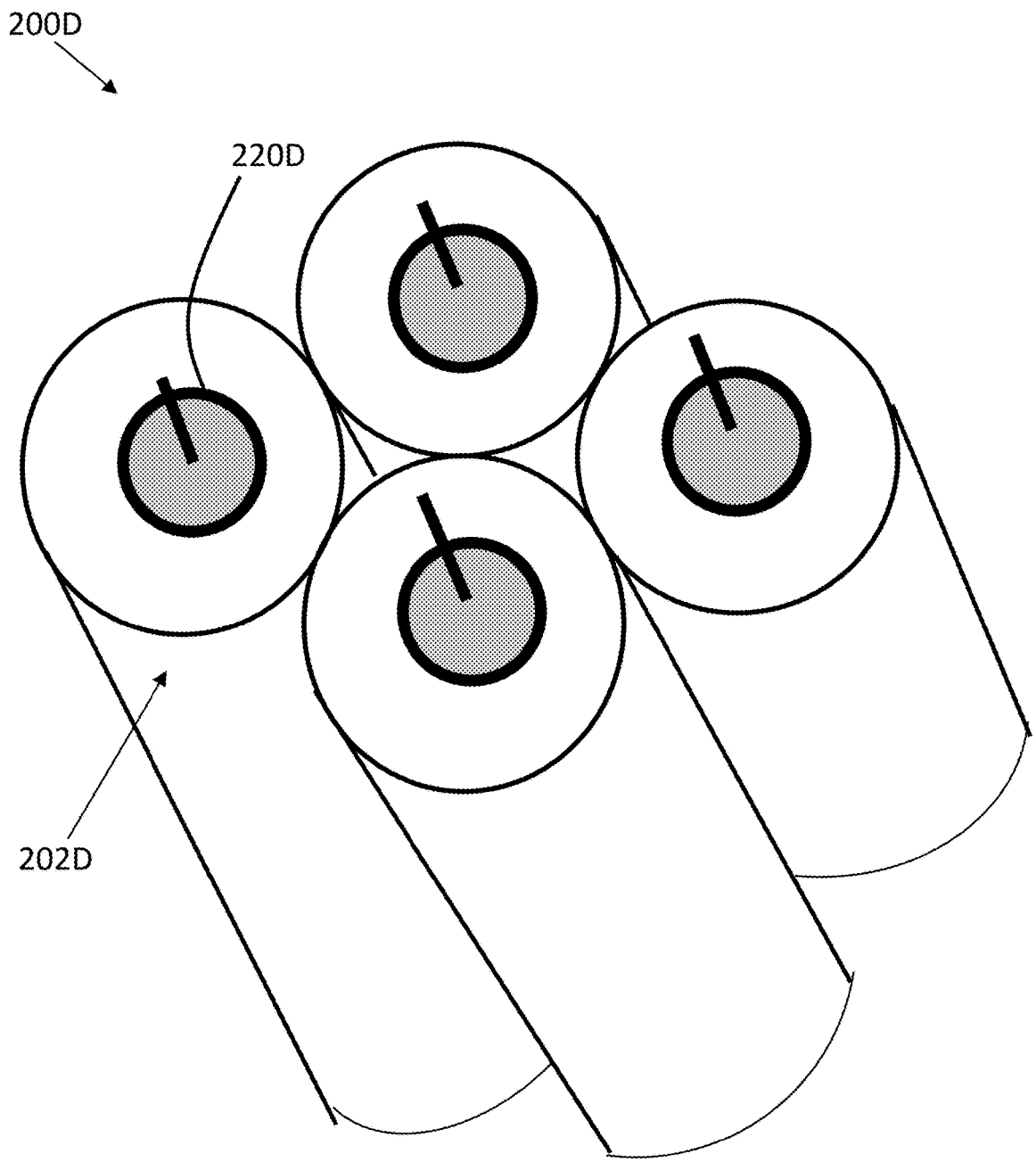

FIG. 2D illustrates one alternative embodiment of collector array geometry 200D. In this embodiment, void chambers 202D have centrally positioned circular electrodes 220D formed by the combination of separator, anode material, and anode collector. As will be understood, each electrically conductive chamber can partially share sidewalls with multiple adjacent chambers. Advantageously, this configuration permits denser packaging than the configuration illustrated with respect to FIG. 2C.

Figure 3A:
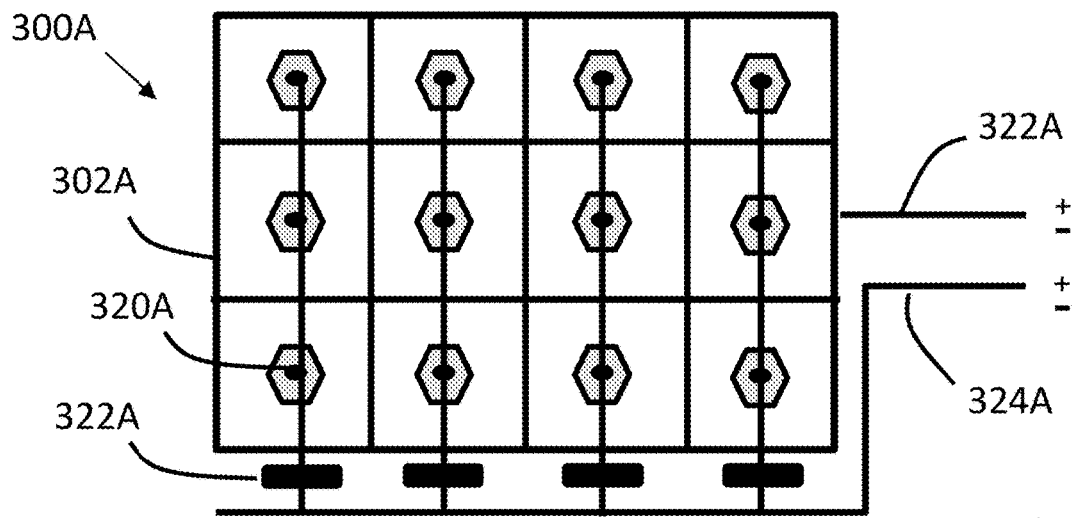
FIGS. 3A-D illustrates various forms of collectors and anode collector interconnection schemes.

FIG. 3A illustrates one alternative embodiment of collector array geometry 300A using a cathode collector and the combination of separator, anode material, and anode collector such as described with respect to FIG. 2A. In this embodiment, rectangular chambers 302A have centrally positioned hexagonal anode electrodes 320A formed by the combination of separator, anode material, and anode collector. As will be understood, each electrically conductive rectangular chamber can share sidewalls with multiple adjacent chambers. As illustrated, the cathode collector has electrical input/output 322A and anode collectors are connected together to have electrical input/output 324A. In this embodiment, connection is through a plurality of adjacent anode connections that are in turn connected to a wire that becomes electrical input/output 324A. In addition, electrical or thermal fuses 322A can be positioned to break electrical connections in the event of failure of a portion of the system 300A.

Figure 3B:
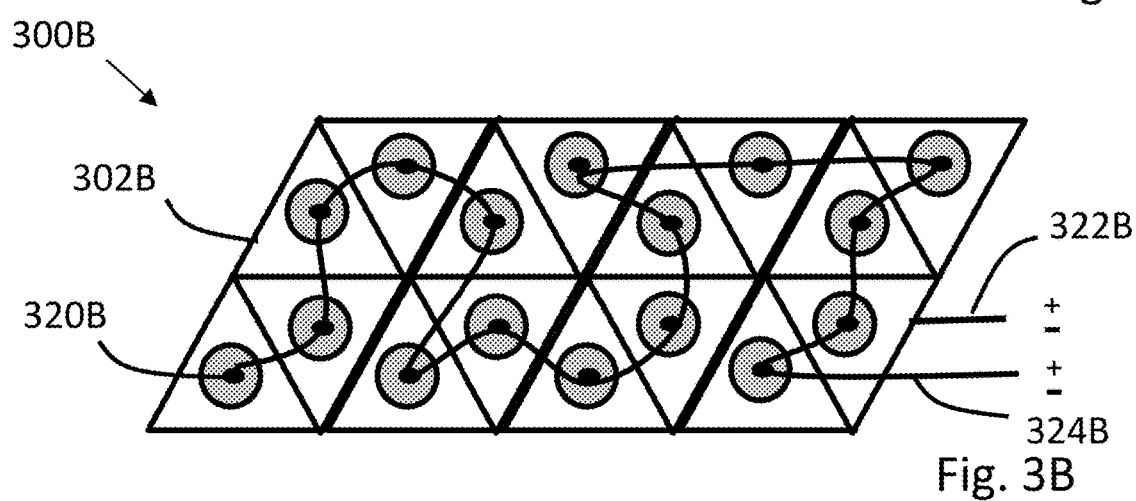

FIG. 3B illustrates one alternative embodiment of collector array geometry 300B using a cathode collector and the combination of separator, anode material, and anode collector such as described with respect to FIG. 2B. In this embodiment, triangular chambers 302B have centrally positioned circular anode electrodes 320B formed by the combination of separator, anode material, and anode collector. As will be understood, each electrically conductive triangular chamber can share sidewalls with multiple adjacent chambers. As illustrated, the cathode collector has electrical input/output 322B and anode collectors are connected together to have electrical input/output 324B. In this embodiment, connection is through a single continuous wire that becomes electrical input/output 324B.

Figure 3C:
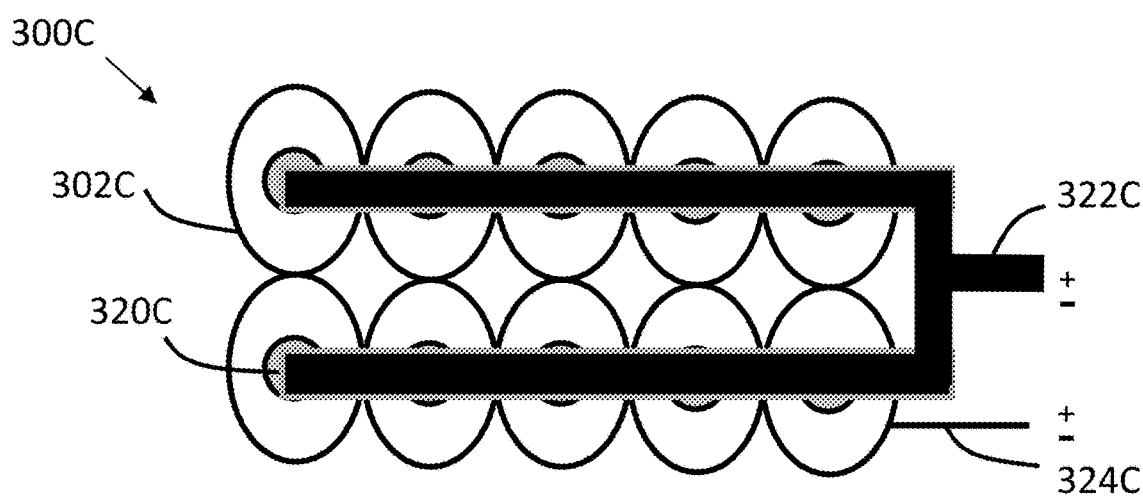

FIG. 3C illustrates one alternative embodiment of collector array geometry 300C using a cathode collector and the combination of separator, anode material, and anode collector such as described with respect to FIG. 2C. In this embodiment, ovoid chambers 302A have centrally positioned circular electrodes 320C formed by the combination of separator, anode material, and anode collector. As will be understood, each electrically conductive chamber can partially share sidewalls with multiple adjacent chambers. As illustrated, the cathode collector has electrical input/output 324C and anode collectors are connected together to have electrical input/output 322C. In this embodiment, connection is through a parallel conductive strip that becomes electrical input/output 324C.

Figure 3D:
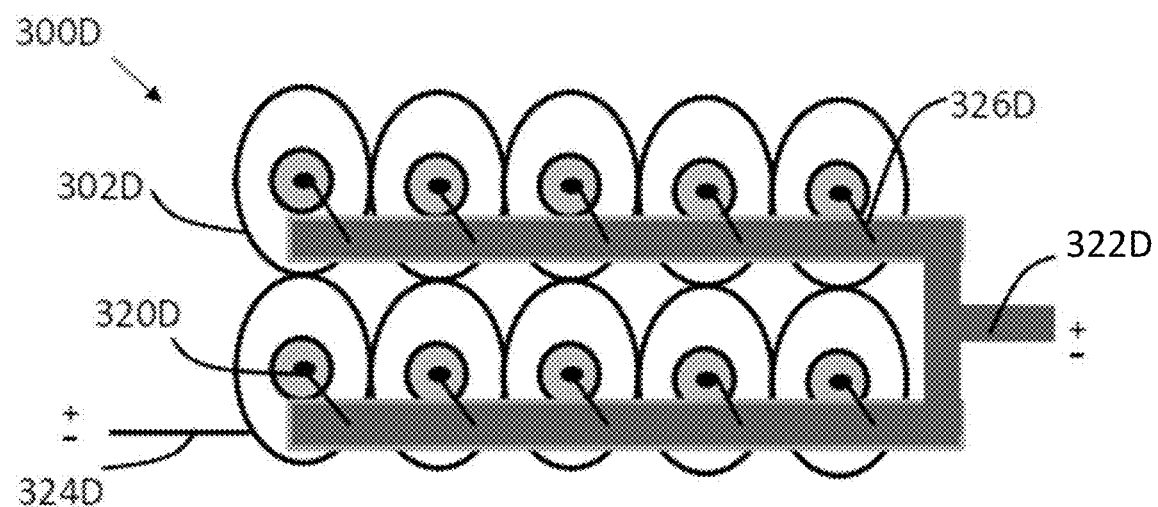

FIG. 3D illustrates one alternative embodiment of collector array geometry 300D using a cathode collector and the combination of separator, anode material, and anode collector such as described with respect to FIG. 2C. In this embodiment, ovoid chambers 302D have centrally positioned circular electrodes 320D formed by the combination of separator, anode material, and anode collector. As will be understood, each electrically conductive chamber can partially share sidewalls with multiple adjacent chambers. As illustrated, the cathode collector has electrical input/output 324D and anode collectors are connected to a conductive bus bar using wires 326D that may act as fuses in case of high current going through one (ore several) of them disconnecting malfunctioning chambers of the cell. In this embodiment, connection is through a parallel conductive strip that becomes electrical input/output 324D.

Figure 4:
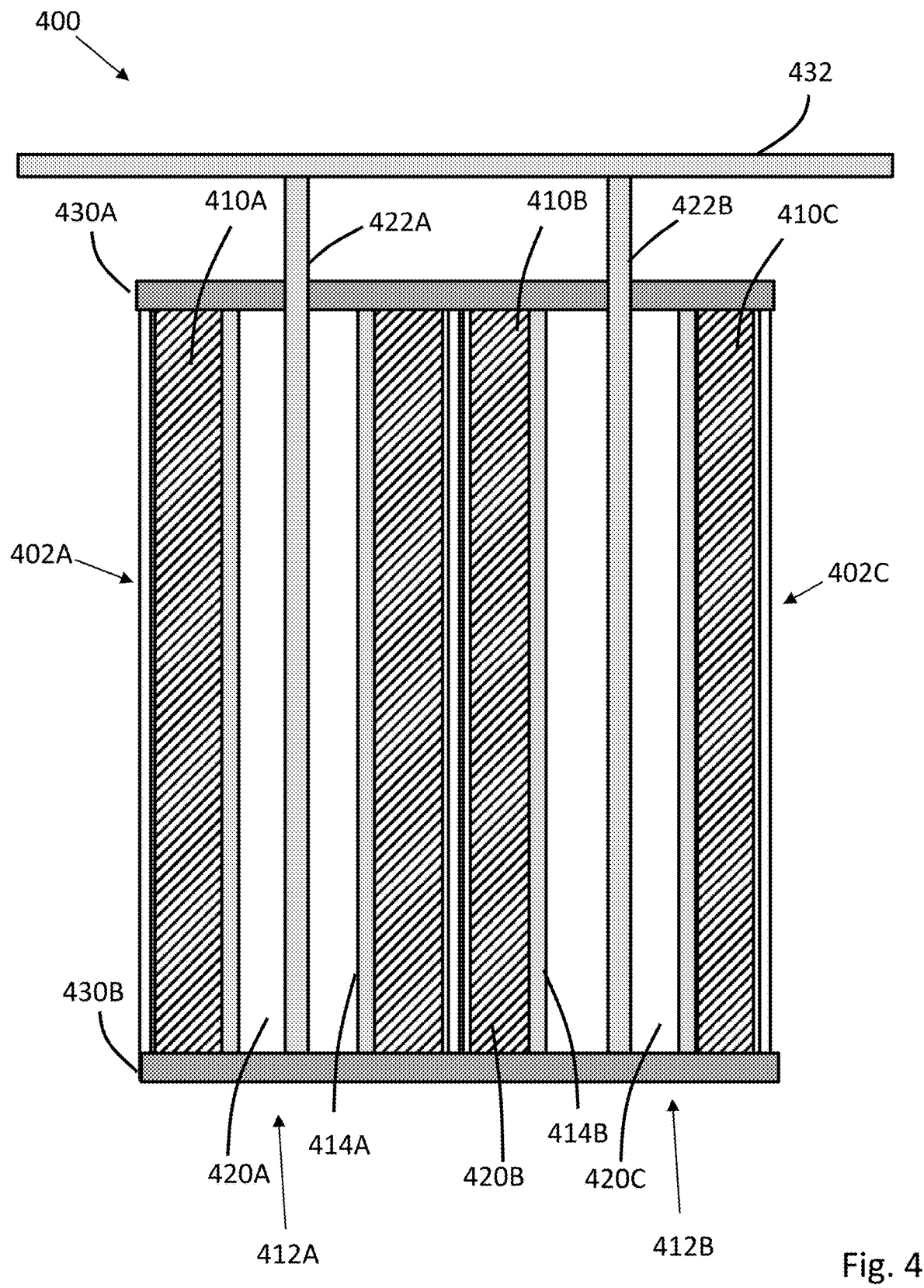
FIG. 4 is a representative member of a collector array with two adjacent chambers illustrated.

FIG. 4 is a representative member of a collector array (having sidewalls 402A, 402B, and 402C) with two adjacent chambers illustrated. System 400 includes a cathode collector arrays 402 that includes multiple electrically connected chambers 412A and 412B adjacent to each other and that surround other battery components. Such battery components include cathode material (410A, 410B, and 410C) and anode material 420A and 420C, both of which can be partially or fully immersed in an electrolyte. The anode material respectively surrounds anode collectors 422A and 422B. The cathode material and anode material are separated from each other by a separators 414A and 414B that only permits electrolyte mediated ion flow back and forth between the cathode and anode materials. In this embodiment, top and bottom of the chambers 412A and 412B and included separator, anode material, and anode collectors are completely sealed with electrically non-conductive materials 430A and 430B such as plastics. In this embodiment, anode collectors 422A and 422B are connected to a single continuous wire 432 that becomes an electrical input/output.

The rechargeable battery cell system 100 of FIG. 1 and embodiments discussed with respect to FIG. 1B-D, FIG. 2A-D, FIG. 3A-D, and FIG. 4 can also include anode material, cathode material, separators, ion exchange material, and other materials and components as described in the following:

Cathode and Anode Collector Material

At least a portion of anode and cathode electrode material is placed in contact with a respective current collector. The current collectors serve to supply an electric current so that it can be consumed for the electrode reaction during charge and collect an electric current generated during discharge. The cathode and anode current collectors are typically formed from a material which has a high electrical conductivity and is inactive to electrochemical battery cell reaction. The current collectors may be shaped in a plate form, foil form, mesh form, porous form-like sponge, punched or slotted metal form, or expanded metal form. The material of the current collector can include Fe, Ni, Ti, Cu, Al, Pt, V, Au, Zn, and alloys of two or more of these metals such as stainless steel.

Anode and Cathode Material

Anode and cathode material can include material formed as thin films, or structured patterns such as columns, needles, groove, or slots. In some embodiments electrodes can be loosely arranged materials, rigidly bound or sintered structures, or solid continuous pore structures. In one embodiment, anode and cathode material can be formed from particles provided in various forms such as powders, granules, pellets, or nanomaterial. In certain embodiments, particles can have an average size (diameter or longest dimension) of between about 0.1 µm to 300 µm and in a specific embodiment, between about 100 µm and 1 µm. In some embodiments, relatively homogeneous particle sizes can be used, while in other embodiments heterogenous sized materials can be used. Particles can be processed to increase effective surface area. In some embodiments, particles can be processed by heating, melting, fusing, or sintering to bind together the particles. In other embodiments, additional binders can be used to hold particles together.

Anode Composition

Anode composition can include a wide range of elements such as zinc, aluminum, magnesium, iron, and lithium and other metals in pure oxide form or salt form, or combinations thereof capable of use in rechargeable electrochemical systems. In some embodiments, relatively pure Zn, ZnO, or a mixture of Zn and ZnO can be used. For a rechargeable zinc negative electrode, the electrochemically active material is the zinc oxide powder or a mixture of zinc and zinc oxide powder. The zinc oxide can dissolve in an alkaline electrolyte to form the zincate ($Zn(OH)_4^{2-}$ Zinc oxide or/and zincate is reduced to zinc metal during the charging process.

More broadly, anode materials can include:

Any metal M, metal oxide MOx or metal salt having a redox potential E0 lower than the redox potential of the cathode material.

Any metal oxide MOx having a redox potential E0 lower than the redox potential of the cathode material.

Any alloy of any metals MM1M2 . . . Mn, mixed oxides or mixed salts having a E0 lower than the E0 of the cathode material.

Any polymer that can accommodate anions in its structure having a redox potential E0 lower than the redox potential of the cathode material.

Any mixture of one or more of the above-mentioned type of materials.

Cathode Composition

Cathode composition can include a wide range of materials such as metal or metal containing compounds such as ferrate salts (Fe(VI)), permanganate salts (Mn(VII)), nickel hydroxide Ni(OH)$_2$, nickel oxyhydroxide NiOOH, manganese dioxide MnO$_2$, copper(II) oxide CuO in conjunction with bismuth(III) oxide Bi$_2$O$_3$, or any combinations capable of use in rechargeable electrochemical systems, and Silver/Silver Oxide.

More broadly, cathode materials can include:

Any metal M having a redox potential E0 larger than the redox potential of the anode material.

Any metal oxide MOx having a redox potential E0 larger than the redox potential of the anode material.

Any alloy of any metals MM1M2 . . . Mn having a E0 larger than the E0 of the anode material.

Any metal fluoride MFn having a redox potential larger than the anode material.

Any alloy MM1M2 . . . MnOxFm with n larger or equal to 2 and m being larger or equal to zero.

Any polymer that can accommodate anions in its structure having a redox potential E0 larger than the redox potential of the anode material.

CFx carbon fluoride with x being between zero and 2.

Salts not stable in aqueous electrolyte solutions, including but not limited to FeVI (iron six) based battery systems.

Any mixture of one or more of the above mentioned type of materials.

In some embodiments, wherein the cathode can include one or more additives selected from the group consisting of Bi, Cu, Sn, Pb, Ag, Co, Ni, Mg, K, Li, Al, Ca, Fe, Zn, V, Ba, Y, Ti, Sr, wherein the additive is in oxide or hydroxide form.

Additives and Binding Agents

Various additives can be used to improve electrochemical, electrical, or mechanical features of the electrodes. For example, electrochemical performance can be improved by addition of nickel, nickel hydroxide, nickel oxyhydroxide, or nickel oxide containing cathode material that can incorporate or be coated with small amounts of cobalt oxide, strontium hydroxide (Sr(OH)2), barium oxide (BaO), calcium hydroxide (Ca(OH)2), Fe3O4, calcium fluoride (CaF2), or yttrium oxide (Y2O3) to improve battery cell performance. As another example, the electrode can include an oxide such as bismuth oxide, indium oxide, and/or aluminum oxide. Bismuth oxide and indium oxide may interact with zinc and reduce gassing at the electrode. Bismuth oxide may be provided in a concentration of between about 1 and 10% by weight of a dry negative electrode formulation. Indium oxide may be present in a concentration of between about 0.05 and 1% by weight of a dry negative electrode formulation. Aluminum oxide may be provided in a concentration of between about 1 and 5% by weight of a dry negative electrode formulation.

In certain embodiments, one or more additives may be included to improve corrosion resistance of the zinc electrode material. Specific examples of anions that may be included to reduce the solubility of zinc in the electrolyte include phosphate, fluoride, borate, zincate, silicate, oxalate, or stearate. Generally, these anions may be present in an electrode in concentrations of up to about 10% by weight of a dry electrode formulation.

Additives that improve electrical characteristics such as conductivity can also be added. For example, a range of carbonaceous materials can be used as electrode additives, including powdery or fibrous carbons such as graphite, coke, ketjen black, and acetylene black. Carbonaceous nanomaterials can also be used such as single or multiwalled carbon nanotubes, carbon nanofibers, multi-layered carbon nanoparticles, carbon nanowhiskers, or carbon nanorods.

Additives may be provided as chemically homogeneous components into a mixture or solution, co-precipitated, or coated onto particles.

Mechanical properties can be improved in one embodiment by addition of binding agents to provide increased electrode mechanical strength, and flexure or crack reduction for the electrode. Binding agents may include, for example, polymeric materials such as polytetrafluoroethylene (PTFE), polyethylene (PE), polypropylene (PP), polyisobutylene (PIB), polyvinyl alcohol (PVA), polyacrylic acid, polyvinyl acetate, carboxy methyl cellulose (CMC), styrene butadiene rubber (SBR), polyethylene oxide (PEO) polybutylene terephthalate (PBT) or polyamides, polyvinylidene fluoride (PVDF), silicone-based elastomers such as polydimethyl siloxane (PDMS) or rubber materials such as natural rubber (NR), ethylene propylene rubber (EPM) or ethylene propylene diene monomer rubber (EPDM).

Ion Exchange Material

In some embodiments, ion exchange materials can be used as a separator or an additive that improves. The ion exchange material is generally selective for the transport of either cations or anions. An anion selective ion exchange material can be used alone, a cation selective ion exchange material can be used alone, or they can be used in combination with each other. In one embodiment the ion exchange material can be an organic or polymeric material having attached strongly acidic groups, such as sulfonic acid including, sodium polystyrene sulfonate, or polyAMPS. Alternatively, the ion exchange material can be an organic or polymeric material having attached strongly basic groups, such as quaternary amino groups including trimethylammonium groups (e.g., polyAPTAC). In another embodiment, the ion exchange material can be an organic or polymeric material having attached weakly acidic groups, including carboxylic acid groups. Alternatively, the ion exchange material can be an organic or polymeric material having attached weakly basic groups, typically featuring primary, secondary, and/or tertiary amino groups (e.g., polyethylene amine).

The ion exchange material can be provided to interact with electrode material as a fully or partially embedding polymer, a particle mixture, a membrane or film, particulates or beads, a coating, or a separator. The anode alone, the cathode alone, or both the anode or cathode can be configured to interact with an ion exchange material, which can be the same or different material for the respective electrodes.

Electrolyte

An electrolyte is used to maintain high ionic conductivity between electrodes and inside electrode pores. Electrolytes can be aqueous based, solvent based, solid polymer, or an ionic liquid. In some embodiments, electrolytes can be semi-solid or gelatinized. Gelatinizing agents can include polymers that absorb the liquid of the electrolyte solution and swell. Such polymers can include polyethylene oxide, polyvinyl alcohol, and polyacrylamide.

In another embodiment the electrolyte can be a solid-state electrolyte. In another embodiment electrolyte can be formed as a solid material with absorbed water. For example, KOH exposed to humid air.

In another embodiment electrolytes can be formed from ion exchange material such as explained above under "Ion exchange material" section.

In one embodiment aqueous alkaline electrolytes can be used. Alkaline electrolytes can include alkalis such as potassium hydroxide, sodium hydroxide, lithium hydroxide, calcium hydroxide or inorganic salts such as zinc bromide.

Separator

A separator may be replaced with (or used in conjunction with) an ion exchange membrane or film. A conventional porous polymer separator or ion exchange separator may be provided as a polymer membrane or film. Typically, a separator is disposed between the anode and the cathode and acts to prevent the anode and the cathode from having internal electrical shorts. In addition, the separator can also act to retain the electrolyte, particularly for battery systems that use different cathode and anode electrolyte solutions. The separator is generally required to have a porous structure or a structure having a number of perforations capable of allowing ions to pass while being chemically stable with respect to the electrolyte solution. In some embodiments, one or more separators can be formed by coating electrodes or particles that collectively form an electrode. The separator can be formed from a nonwoven fabric or a membrane having a micropore structure made of glass, polypropylene, polyethylene, resin, or polyamide. Alternatively, the separator may be constituted by a metal oxide film, or a resin film combined with a metal oxide respectively having a plurality of perforations.

Processing

In one embodiment, a dry mixing process can be performed in which various anode and cathode materials, as well as additives and binders are mixed while dry. Optional processing steps such as heating, fusing, compressing, and melting ion exchange material can be performed before placing the mixture in a battery casing. In other embodiments, optional processing steps such as heating, fusing, compressing, and melting ion exchange material can be performed after placing the mixture in a battery casing. A liquid electrolyte can be added before sealing the battery casing.

According to other embodiments, a wet mixing process may instead be utilized. In a wet mixing process, one or more solvents are added at the beginning or during the mixing process, or, alternatively, one or more ingredients may be used in the form of a dispersion or suspension. The solvent(s) can be subsequently removed after the mixing process or later state in the production process.

In other embodiments, embodiment, the various individual components may be made using different methods. For example, some of the electrode may be produced using a dry mixing process, while portions of the electrode may be produced using a wet process. According to yet another embodiment, it is possible to combine both dry and wet processes for the different components.

Battery and Cell Design

The battery cells can have any of a number of different shapes and sizes. For example, coin, prismatic, pouch or cylindrical cells can be used. Cylindrical cells may have the diameter and length of conventional 18650, 26650, AAA cells, AA cells, A cells, C, or D cells or others. Custom cell designs can be used in some applications. For example, prismatic cell designs can be used for portable or vehicular applications, as well as various larger format cells employed for various non-portable applications. A battery pack can be specifically designed for particular tools or applications. Battery packs can include one or more battery cells and appropriate casing, contacts, and conductive lines to permit reliable charge and discharge in an electric device.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A rechargeable battery cell, comprising:
first and second electrode materials;
a first collector defining a chamber array with a plurality of chambers electrically connected to each other, wherein the chamber array is comprised of a plurality of structurally distinct electrode collectors, wherein an electrode collector in the chamber array is at least in partial contact with at least one other electrode collector in the chamber array, wherein the partial contact establishes and maintains an electrical connection between the electrode and the at least one other electrode, and wherein the plurality of electrode collectors comprise the first collector via an electrical interconnection;
a plurality of second electrode material and second collectors positioned within each of the plurality of chambers; and
wherein the first electrode material is positioned within the first collector to surround the second electrode material, with the second electrode material separated from the first electrode material by a separator.

2. The rechargeable battery cell of claim 1, wherein the first electrode material comprises a cathode material and the second electrode material comprises anode material.

3. The rechargeable battery cell of claim 1, wherein the first electrode material comprises an anode material and the second electrode material comprises cathode material.

4. The rechargeable battery cell of claim 1, wherein the first collector comprises a cathode collector and the second collector comprises an anode collector.

5. The rechargeable battery cell of claim 1, wherein the first collector comprises an anode collector and the second collector comprises a cathode collector.

6. The rechargeable battery cell of claim 1, wherein second collectors extend outward from each of the plurality of chambers.

7. The rechargeable battery cell of claim 1, wherein each of the plurality of chambers has at least one of a polygonal, rectangular, circular, ovoid, or hexagonal cross section.

8. The rechargeable battery cell of claim 1, wherein each of the plurality of chambers has at least one common sidewall that provides the partial contact between the chambers.

9. The rechargeable battery cell of claim 1, wherein the first electrode material comprises cathode material further comprising at least one of a metal or metal containing compounds such as ferrate salts (Fe(VI)), permanganate salts (Mn(VII)), nickel hydroxide $Ni(OH)_2$, nickel oxyhydroxide NiOOH, manganese dioxide $MnO_2$, copper(II) oxide CuO in conjunction with bismuth(III) oxide $Bi_2O_3$, or any combinations capable of use in rechargeable electrochemical systems, and silver/silver oxide.

10. The rechargeable battery cell of claim 1, wherein the second electrode material comprises anode material further comprising zinc, aluminum, magnesium, iron, and lithium and other metals in pure oxide form or salt form, or combinations thereof capable of use in rechargeable electrochemical systems.

11. The rechargeable battery cell of claim 1, wherein the second electrode material comprises cathode material further comprising at least one of a metal or metal containing compounds such as ferrate salts (Fe(VI)), permanganate salts (Mn(VII)), nickel hydroxide $Ni(OH)_2$, nickel oxyhydroxide NiOOH, manganese dioxide $MnO_2$, copper(II) oxide CuO in conjunction with bismuth(III) oxide $Bi_2O_3$, or any combinations capable of use in rechargeable electrochemical systems, and silver/silver oxide.

12. The rechargeable battery cell of claim 1, wherein the first electrode material comprises anode material further comprising zinc, aluminum, magnesium, iron, and lithium and other metals in pure oxide form or salt form, or combinations thereof capable of use in rechargeable electrochemical systems.

13. The rechargeable battery cell of claim 1, wherein each chamber in the plurality of chambers shares at least one common sidewall that provides the partial contact between the chambers.

14. The rechargeable battery cell of claim 1, further comprising electrical fuses to break electrical connection between one or more second collectors.

15. The rechargeable battery cell of claim 1, wherein each electrode collector includes an electrode formed by the second electrode material has a hexagonal cross-section, and wherein the electrode is centrally positioned in the corresponding chamber.

* * * * *